(12) United States Patent
Kang et al.

(10) Patent No.: US 8,773,105 B1
(45) Date of Patent: Jul. 8, 2014

(54) VOLTAGE REGULATORS WITH LARGE SPIKE REJECTION

(75) Inventors: Chih-Kai Kang, San Jose, CA (US);
Wyant Chan, Sunnyvale, CA (US);
Pierte Roo, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 129 days.

(21) Appl. No.: 13/346,174

(22) Filed: Jan. 9, 2012

Related U.S. Application Data (60) Provisional application No. 61/434,364, filed on Jan. 19, 2011.

(51) Int. Cl.
*G05F 3/16* (2006.01)
*G05F 3/20* (2006.01)
*H02H 7/00* (2006.01)
*H02H 9/00* (2006.01)

(52) U.S. Cl.
USPC ............................. 323/315; 323/313; 361/18

(58) Field of Classification Search
USPC ................ 323/313–316; 361/18, 52
See application file for complete search history.

(56) References Cited

U.S. PATENT DOCUMENTS

| | | | | |
|---|---|---|---|---|
| 6,157,176 A | * | 12/2000 | Pulvirenti et al. | 323/266 |
| 7,772,816 B2 | * | 8/2010 | Cho et al. | 323/280 |
| 2004/0041607 A1 | * | 3/2004 | Pan | 327/170 |
| 2006/0001433 A1 | * | 1/2006 | Bouton et al. | 324/536 |
| 2010/0315056 A1 | * | 12/2010 | Sessions | 323/284 |

* cited by examiner

*Primary Examiner* — Adolf Berhane
*Assistant Examiner* — Gary Nash (57) ABSTRACT

A voltage regulator includes a master circuit, first and second filters, and a slave circuit. The master circuit provides a second reference voltage based on a first reference voltage and a supply voltage. The first filter provides a filtered second reference voltage based on the second reference voltage. The second filter provides a filtered supply voltage based on the supply voltage. The slave circuit provides a third reference voltage based on the filtered second reference voltage and the filtered supply voltage. The second filter includes an NMOS transistor and a capacitor. The gate and the drain of the NMOS transistor receive the supply voltage. A first terminal of the capacitor is electrically coupled to a source of the NMOS transistor. A second terminal of the capacitor is electrically coupled to ground. The source of the NMOS transistor provides the filtered supply voltage.

18 Claims, 7 Drawing Sheets

VOLTAGE REGULATORS WITH LARGE SPIKE REJECTION

CROSS-REFERENCE TO RELATED APPLICATIONS

This disclosure claims the benefit of U.S. Provisional Patent Application Ser. No. 61/434,364, filed on Jan. 19, 2011, entitled "VOLTAGE REGULATOR WITH LARGE SPIKE REJECTION," the disclosure thereof incorporated by reference herein in its entirety.

FIELD

The present disclosure relates generally to the field of voltage regulation.

More particularly, the present disclosure relates to rejection of large voltage spikes in voltage regulators.

BACKGROUND

In electronic systems with large switching or transient voltage spikes, linear voltage regulators are commonly employed to reject the spikes. However, when the spikes are large enough, voltage regulators can fail to reject those spikes. When large spikes occur, the conventional regulator output shows similar spikes, as shown in FIGS. 1-4. Spikes in the regulated voltage cause circuit malfunctions in the load circuits fed by the regulated voltage. For example, such spikes can cause the load circuits to reset and the like.

Figure 1:
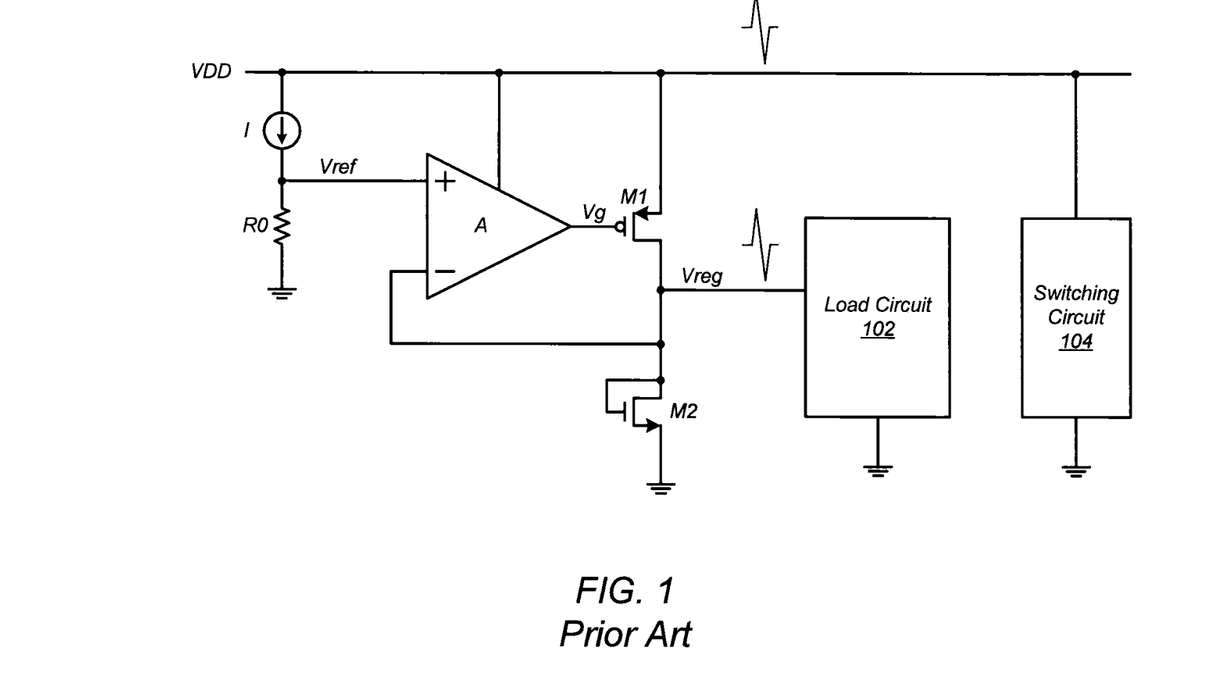
FIG. 1 shows a conventional linear voltage regulator with a p-channel metal-oxide-semiconductor field-effect (PMOS) pass transistor.

FIG. 1 shows a circuit that includes a conventional linear voltage regulator with a p-channel metal-oxide-semiconductor field-effect (PMOS) pass transistor M1. A current source I and resistor R0 provide an input reference voltage Vref to the positive input of an operational amplifier A. An n-channel MOS (NMOS) transistor M2 is configured as a diode to provide a bleeder current. In other embodiments, the bleeder current can be provided in other ways.

The source of transistor M1 receives supply voltage VDD. The gate of transistor M1 is connected to the output of operational amplifier A. The negative input of operational amplifier A is connected to the drain of transistor M1, and to the gate and drain of transistor M2. The drain of transistor M1 provides a regulated voltage Vreg to a load circuit 102.

Figure 2:
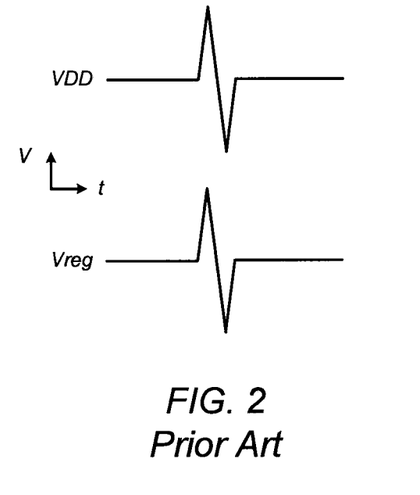
FIG. 2 shows a plot of supply voltage and regulated voltage over time for the voltage regulator of FIG. 1.

The circuit of FIG. 1 includes a switching circuit 104 that causes large positive and negative voltage spikes in supply voltage VDD. FIG. 2 shows a plot of supply voltage VDD and regulated voltage Vreg over time t for the voltage regulator of FIG. 1. As can be seen in FIG. 2, the voltage regulator of FIG. 1 is unable to reject the spikes in supply voltage VDD, and so passes these spikes in regulated voltage Vreg.

Figure 3:
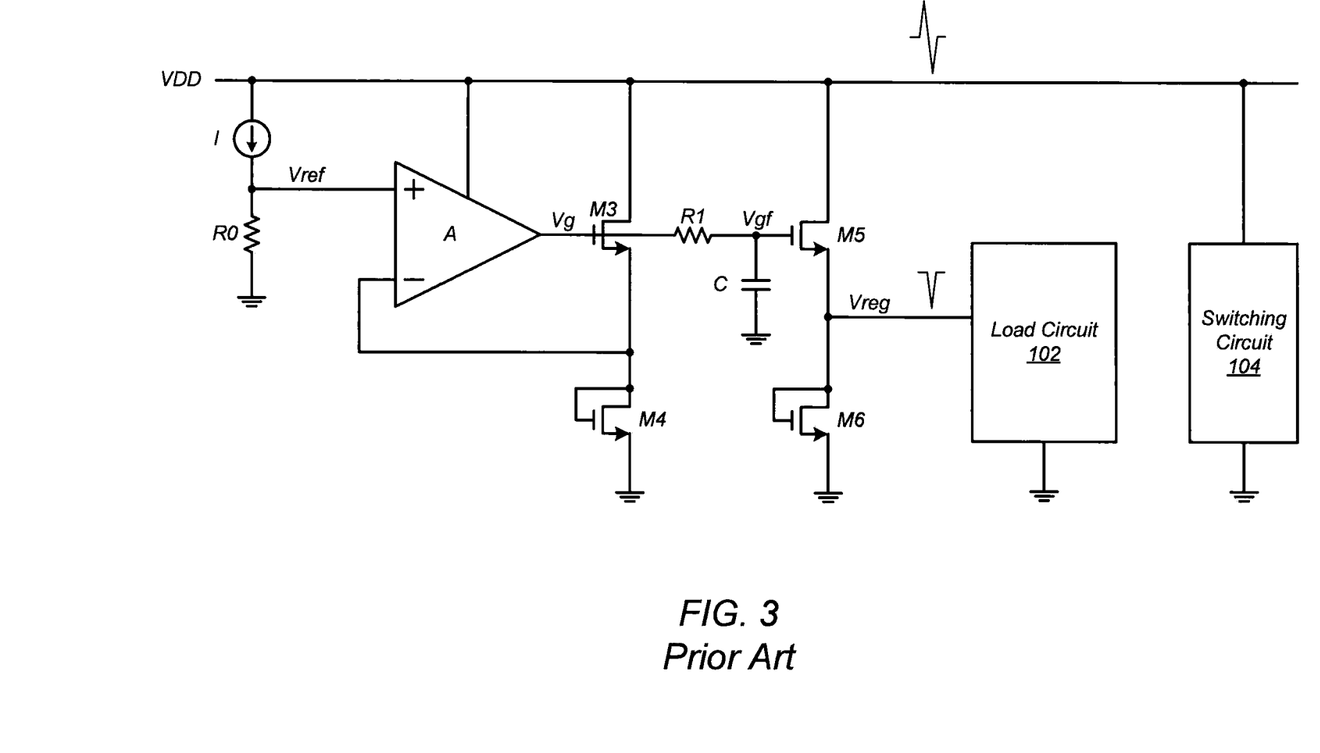
FIG. 3 shows a conventional linear voltage regulator with an NMOS pass transistor and a ground-referenced RC filter.

In order to reject such voltage spikes, some conventional implementations include an RC filter. FIG. 3 shows a circuit that includes a conventional linear voltage regulator with an NMOS pass transistor M5 and a ground-referenced RC filter that includes a resistor R1 and a capacitor C. A current source I and resistor R0 provide an input reference voltage Vref to the positive input of operational amplifier A. Two NMOS transistors M4 and M6 are configured as respective diodes to provide bleeder currents. In other embodiments, the bleeder currents can be provided in other ways.

The drain of transistors M3 and M5 receive supply voltage VDD. The gate of transistor M3 is connected to the output of operational amplifier A. The negative input of operational amplifier A is connected to the source of transistor M3, and to the gate and drain of transistor M4. The gate of transistor M3 provides a bias voltage Vg. Resistor R1 and capacitor C filter bias voltage Vg, and thereby provide a filtered bias voltage Vgf.

The gate of pass transistor M5 receives filtered bias voltage Vgf. The source of transistor M5 is connected to the gate and drain of transistor M6. The source of transistor M5 provides a regulated voltage Vreg to load circuit 102.

Figure 4:
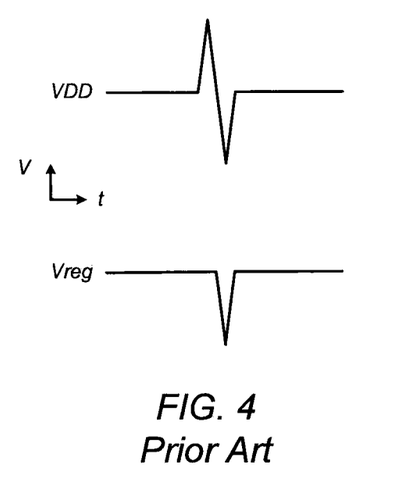
FIG. 4 shows a plot of supply voltage and regulated voltage over time for the voltage regulator of FIG. 3.

FIG. 4 shows a plot of supply voltage VDD and regulated voltage Vreg over time t for the voltage regulator of FIG. 3. As can be seen in FIG. 4, the RC filter rejects positive voltage spikes in supply voltage VDD. However, the voltage regulator of FIG. 3 is unable to reject negative spikes in supply voltage VDD, and so passes these spikes in regulated voltage Vreg.

SUMMARY

In general, in one aspect, an embodiment features a voltage regulator comprising: a master circuit configured to provide a second reference voltage based on a first reference voltage and a supply voltage; a first filter configured to provide a filtered second reference voltage based on the second reference voltage, and to reject positive spikes in the second reference voltage; a second filter configured to provide a filtered supply voltage based on the supply voltage, and to reject negative spikes in the supply voltage; and a slave circuit configured to provide a third reference voltage based on the filtered second reference voltage and the filtered supply voltage. Embodiments of the voltage regulator can include one or more of the following features.

In some embodiments, the master circuit comprises: an operational amplifier, wherein a supply terminal of the operational amplifier is configured to receive the supply voltage, and wherein a positive input terminal of the operational amplifier is configured to receive the first reference voltage; and a first n-channel metal-oxide-semiconductor field-effect (NMOS) transistor, wherein a gate of the first NMOS transistor is electrically coupled to an output terminal of the operational amplifier, wherein a drain of the first NMOS transistor receives the filtered supply voltage, and wherein a source of the first NMOS transistor is electrically coupled to a negative input terminal of the operational amplifier; and wherein the gate of the first NMOS transistor is configured to provide the second reference voltage. In some embodiments, the master circuit further comprises: a second NMOS transistor, wherein a gate of the second NMOS transistor is electrically coupled to the source of the first NMOS transistor, wherein a drain of the second NMOS transistor is electrically coupled to the source of the first NMOS transistor, and wherein a source of the second NMOS transistor is electrically coupled to ground. In some embodiments, the first filter comprises: a resistor, wherein a first terminal of the resistor is configured to receive the second reference voltage; and a first capacitor, wherein a first terminal of the first capacitor is electrically coupled to a second terminal of the resistor, and wherein a second terminal of the first capacitor is electrically coupled to ground; and wherein the second terminal of the resistor is configured to provide the filtered second reference voltage. In some embodiments, the second filter comprises: a third NMOS transistor, wherein a gate of the third NMOS transistor is configured to receive the supply voltage, and wherein a drain of the third NMOS transistor is configured to receive the supply voltage; and a second capacitor, wherein a first terminal of the second capacitor is electrically coupled to a source of the third NMOS transistor, and wherein a second terminal of the second capacitor is electrically coupled to ground; and wherein the source of the third NMOS transistor is configured to provide the filtered supply voltage. In some embodiments, the slave circuit comprises: a fourth NMOS transistor, wherein a gate of the fourth NMOS transistor is configured to receive the filtered second reference voltage, wherein a drain of the fourth NMOS transistor is configured to receive the filtered supply voltage, and wherein a source of the fourth NMOS transistor is configured to provide the third reference voltage. In some embodiments, the slave circuit further comprises: a fifth NMOS transistor, wherein a gate of the fifth NMOS transistor is electrically coupled to the source of the fourth NMOS transistor, wherein a drain of the fifth NMOS transistor is electrically coupled to the source of the fourth NMOS transistor, and wherein a source of the fifth NMOS transistor is electrically coupled to ground. In some embodiments, the master circuit comprises: an operational amplifier, wherein a supply terminal of the operational amplifier is configured to receive the supply voltage, and wherein a positive input terminal of the operational amplifier is configured to receive the first reference voltage; and a first NPN bipolar junction transistor (BJT), wherein a base of the first NPN BJT is electrically coupled to an output terminal of the operational amplifier, wherein a collector of the first NPN BJT is electrically coupled to the filtered supply voltage, and wherein a emitter of the first NPN BJT is electrically coupled to a negative input terminal of the operational amplifier; and wherein the base of the first NPN BJT is configured to provide the second reference voltage. Some embodiments comprise an integrated circuit comprising: the voltage regulator; and a load circuit, wherein the load circuit is configured to receive the third reference voltage. Some embodiments comprise: a switching circuit, wherein the switching circuit creates at least one of the positive spikes in the supply voltage, and the negative spikes in the supply voltage.

In some embodiments, the master circuit further comprises: a second NPN BJT, wherein a base of the second NPN BJT is electrically coupled to the emitter of the first NPN BJT, wherein a collector of the second NPN BJT is electrically coupled to the emitter of the first NPN BJT, and wherein a emitter of the second NPN BJT is electrically coupled to ground. In some embodiments, the first filter comprises: a resistor, wherein a first terminal of the resistor is configured to receive the second reference voltage; and a first capacitor, wherein a first terminal of the first capacitor is electrically coupled to a second terminal of the resistor, and wherein a second terminal of the first capacitor is electrically coupled to ground; and wherein the second terminal of the resistor is configured to provide the filtered second reference voltage. In some embodiments, the second filter comprises: a third NPN BJT, wherein a base of the third NPN BJT is configured to receive the supply voltage, and wherein a collector of the third NPN BJT is configured to receive the supply voltage; and a second capacitor, wherein a first terminal of the second capacitor is electrically coupled to an emitter of the third NPN BJT, and wherein a second terminal of the second capacitor is electrically coupled to ground; and wherein the emitter of the third NPN BJT is configured to provide the filtered supply voltage. In some embodiments, the slave circuit comprises: a fourth NPN BJT, wherein a base of the fourth NPN BJT is configured to receive the filtered second reference voltage, wherein a collector of the fourth NPN BJT is configured to receive the filtered supply voltage, and wherein an emitter of the fourth NPN BJT is configured to provide the third reference voltage. In some embodiments, the slave circuit further comprises: a fifth NPN BJT, wherein a base of the fifth NPN BJT is electrically coupled to the emitter of the fourth NPN BJT, wherein a collector of the fifth NPN BJT is electrically coupled to the emitter of the fourth NPN BJT, and wherein an emitter of the fifth NPN BJT is electrically coupled to ground.

Some embodiments comprise an integrated circuit comprising: the voltage regulator; and a load circuit, wherein the load circuit is configured to receive the third reference voltage. Some embodiments comprise: a switching circuit, wherein the switching circuit creates at least one of the positive spikes in the supply voltage, and the negative spikes in the supply voltage.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments of the present disclosure provide voltage regulators that are able to reject large positive and negative supply voltage spikes. Such spikes can be caused by switching circuits or in other ways. While the described embodiments are implemented using n-channel metal-oxide-semiconductor field-effect (NMOS) transistors, other embodiments can be implemented using other technologies. For example, the NMOS transistors can be replaced with NPN bipolar junction transistors (BJT). The described embodiments can be implemented as one or more integrated circuits, as discrete components, as a combination of the two, or the like.

Figure 5:
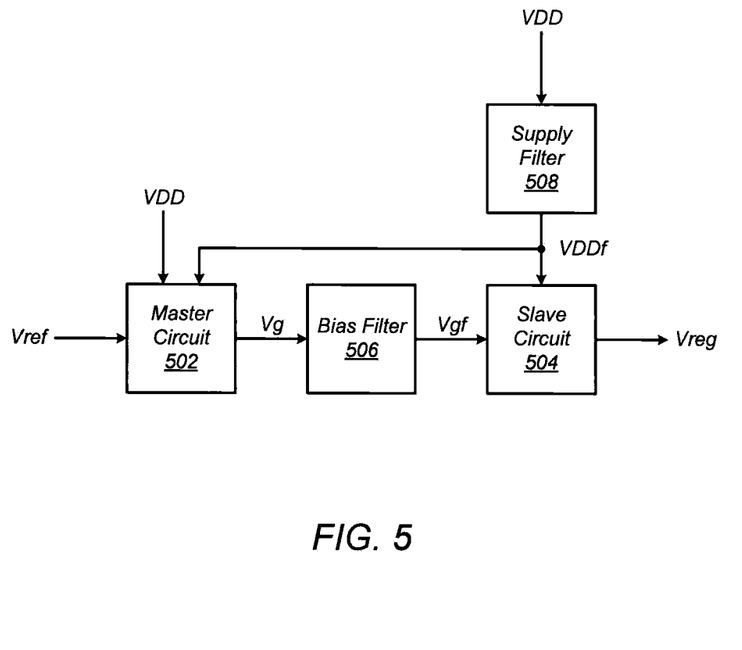
FIG. 5 is a block diagram of a voltage regulator according to one embodiment.

FIG. 5 is a block diagram of a voltage regulator according to one embodiment. Referring to FIG. 5, the voltage regulator includes a master circuit 502, a slave circuit 504, a bias filter 506, and a supply filter 508.

Master circuit 502 is configured to provide a bias voltage Vg based on a reference voltage Vref and a supply voltage VDD. Bias filter 506 is configured to provide a filtered bias voltage Vgf based on bias voltage Vg, and to reject positive spikes in bias voltage Vg.

Supply filter 508 is configured to provide a filtered supply voltage VDDf based on supply voltage VDD, and to reject negative spikes in supply voltage VDD. Slave circuit 504 is configured to provide a regulated voltage Vreg based on filtered bias voltage Vgf and filtered supply voltage VDDf. Master circuit 502 can drive multiple slave circuits 504. For clarity, only one slave circuit 504 is shown.

Figure 6:
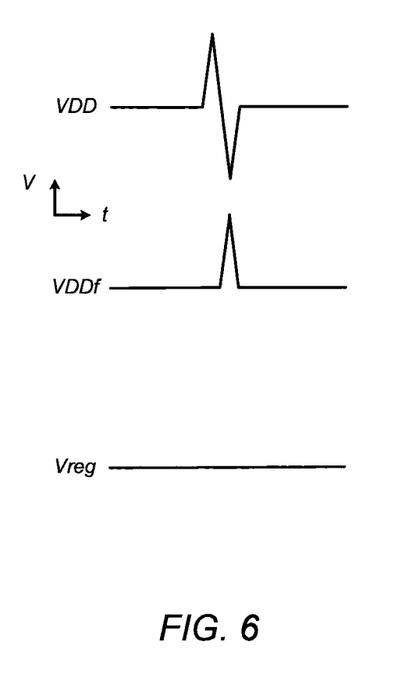
FIG. 6 shows a plot of supply voltage and regulated voltage over time for the voltage regulator of FIG. 5.

FIG. 6 shows a plot of supply voltage VDD, filtered supply voltage VDDf, and regulated voltage Vreg over time t for the voltage regulator of FIG. 5. As can be seen in FIG. 6, supply filter 508 rejects negative voltage spikes in supply voltage VDD. In addition, bias filter 506 rejects positive voltage spikes. Therefore, the voltage regulator of FIG. 5 is able to reject both positive and negative spikes in supply voltage VDD, and so these spikes do not appear in regulated voltage Vreg.

Figure 7:
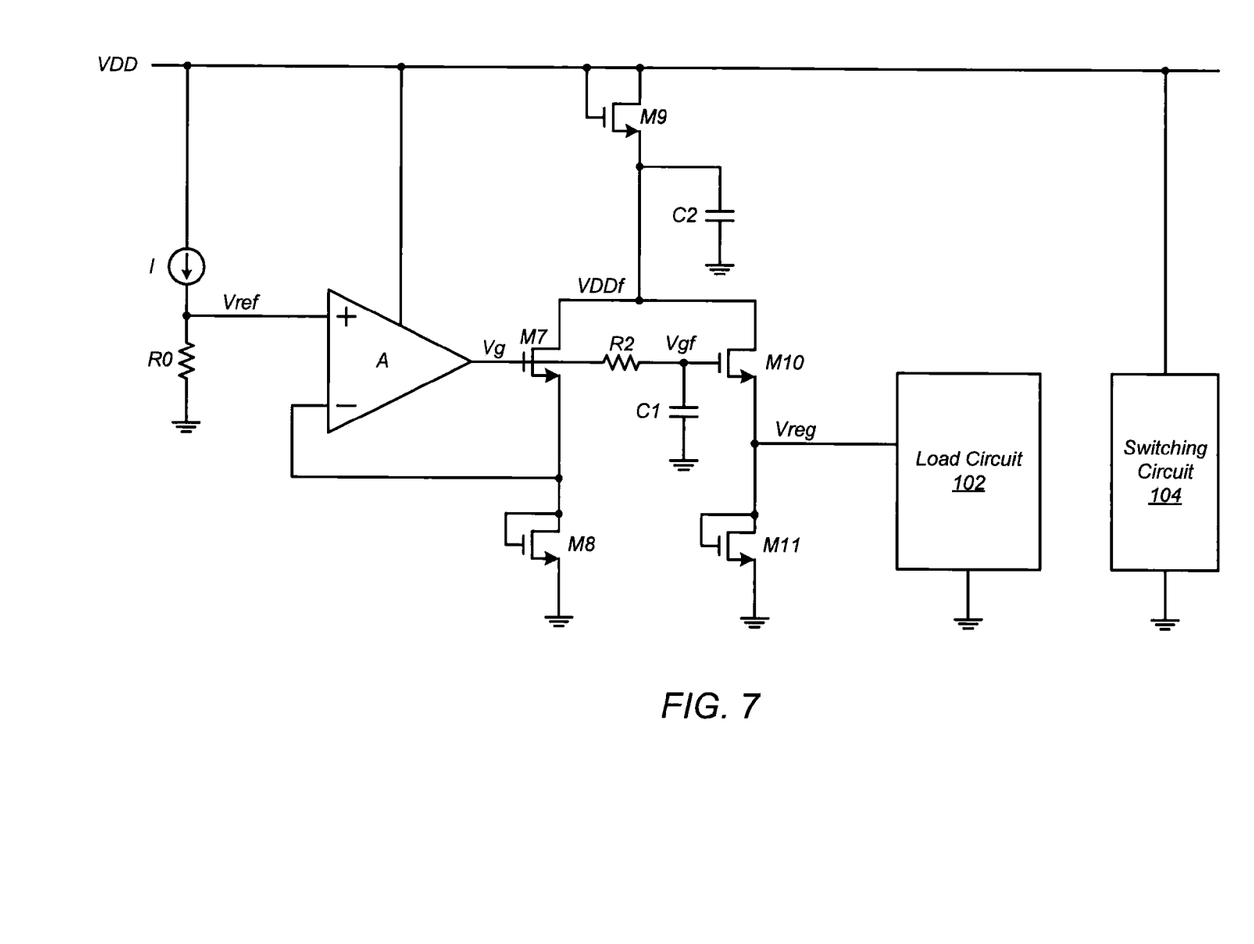
FIG. 7 shows an NMOS implementation of the voltage regulator of FIG. 5 according to one embodiment.

FIG. 7 shows a circuit that includes an NMOS implementation of the voltage regulator of FIG. 5 according to one embodiment. Master circuit 502 is implemented with an operational amplifier A and NMOS transistors M7 and M8. Slave circuit 504 is implemented with NMOS transistors M10 and M11. Bias filter 506 is implemented with a resistor R2 and a capacitor C1. Supply filter 508 is implemented with an NMOS transistor M9 and a capacitor C2. In one embodiment, the resistance of resistor R2 is on the order of 20 kΩ, the capacitance of capacitor C1 is on the order of 0.1 pF, and the capacitance of capacitor C2 is on the order of 5 pF. Other implementations can employ different values for R2, C1, and C2.

A current source I and resistor R0 provide an input reference voltage Vref. Transistors M8 and M11 are configured as respective diodes to provide bleeder currents. In other embodiments, input reference voltage Vref and the bleeder currents can be provided in other ways. The supply terminal of operational amplifier A is configured to receive supply voltage VDD. The positive input terminal of operational amplifier A is configured to receive the reference voltage Vref.

The gate of transistor M7 is electrically coupled to the output terminal of operational amplifier A. The drain of transistor M7 receives filtered supply voltage VDDf. The source of transistor M7 is electrically coupled to the negative input terminal of operational amplifier A. The gate of transistor M7 is configured to provide bias voltage Vg.

The gate and drain of transistor M8 are electrically coupled to the source of transistor M7. The source of transistor M8 is electrically coupled to ground.

A first terminal of resistor R2 is configured to receive bias voltage Vg. A first terminal of capacitor C1 is electrically coupled to a second terminal of resistor R2. A second terminal of capacitor C1 is electrically coupled to ground. A second terminal of resistor R2 is configured to provide filtered bias voltage Vgf.

The gate and drain of transistor M9 are configured to receive supply voltage VDD. A first terminal of capacitor C2 is electrically coupled to the source of transistor M9. A second terminal of capacitor C2 is electrically coupled to ground. The source of transistor M9 is configured to provide filtered supply voltage VDDf.

The gate of transistor M10 is configured to receive filtered bias voltage Vgf. The drain of transistor M10 is configured to receive filtered supply voltage VDDf. The source of transistor M10 is configured to provide regulated voltage Vreg to load circuit 102.

The gate and drain of transistor M11 are electrically coupled to the source of transistor M10. The source of transistor M11 is electrically coupled to ground.

When there is a positive spike in supply voltage VDD, filtered supply voltage VDDf will follow the spike. When there is a negative spike in supply voltage VDD, capacitor C2 holds the voltage and transistor M9 is shut off. In this way the transistor M9 and capacitor C2 filter out negative spikes but not positive spikes.

Bias voltage Vg is filtered by the ground-referenced bias filter comprising resistor R2 and capacitor C1. Being ground-referenced, the bias filter is insensitive to positive spikes in filtered supply voltage VDDf. The bias filter therefore provides a clean filtered gate voltage Vgf for transistor M10. As a result, regulated voltage Vreg is insensitive to any spikes in supply voltage VDD.

Supply voltage VDD is also used for the supply voltage of operational amplifier A. Because operational amplifier A1 has limited bandwidth, high-frequency noise in supply voltage VDD does not appear at the output terminal of operational amplifier A in bias voltage Vg.

Figure 8:
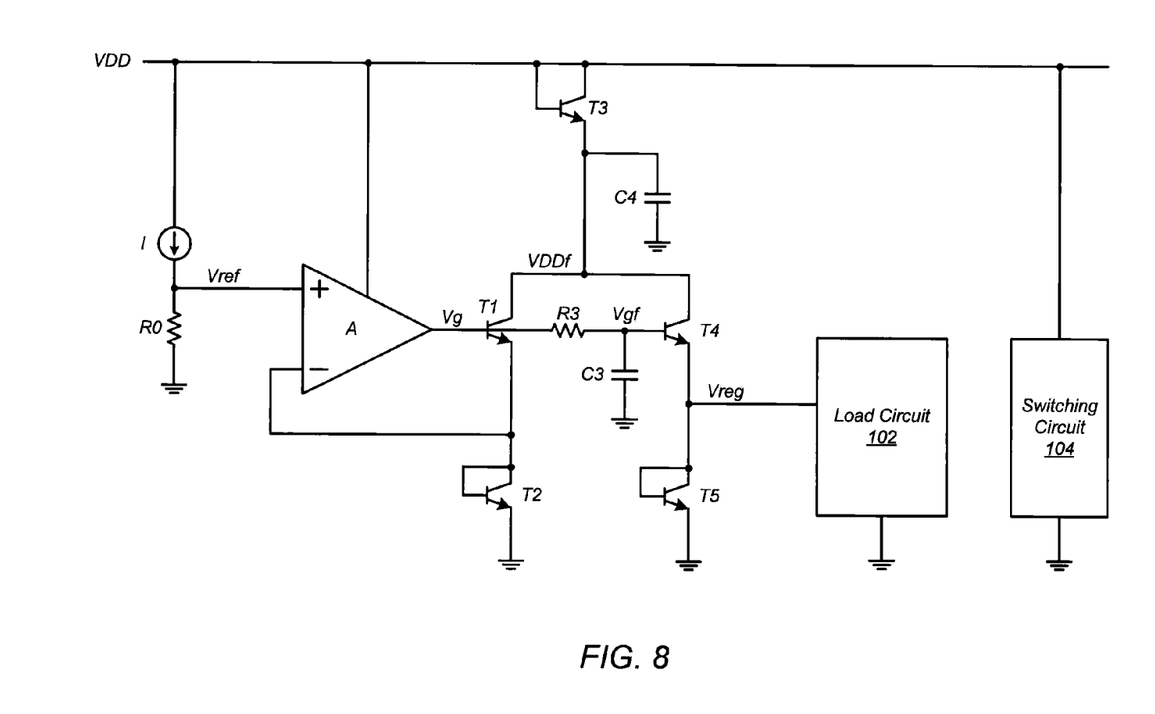
FIG. 8 shows a NPN bipolar junction transistor (BJT) implementation of the voltage regulator of FIG. 5 according to one embodiment.

FIG. 8 shows a circuit that includes an NPN bipolar junction transistor (BJT) implementation of the voltage regulator of FIG. 5 according to one embodiment. Master circuit 502 is implemented with an operational amplifier A and NPN BJT transistors T1 and T2. Slave circuit 504 is implemented with NPN BJT transistors T4 and T5. Bias filter 506 is implemented with a resistor R3 and a capacitor C3. Supply filter 508 is implemented with an NPN BJT transistor T3 and a capacitor C4. In one embodiment, the resistance of resistor R3 is on the order of 20 kΩ, the capacitance of capacitor C3 is on the order of 0.1 pF, and the capacitance of capacitor C4 is on the order of 5 pF. Other implementations can employ different values for R3, C3, and C4.

A current source I and resistor R0 provide an input reference voltage Vref. Transistors T2 and T5 are configured as respective diodes to provide bleeder currents. In other embodiments, input reference voltage Vref and the bleeder currents can be provided in other ways. The supply terminal of operational amplifier A is configured to receive supply voltage VDD. The positive input terminal of operational amplifier A is configured to receive the reference voltage Vref.

The base of transistor T1 is electrically coupled to the output terminal of operational amplifier A. The collector of transistor T1 receives filtered supply voltage VDDf. The emitter of transistor T1 is electrically coupled to the negative input terminal of operational amplifier A. The base of transistor T1 is configured to provide bias voltage Vg.

The base and collector of transistor T2 are electrically coupled to the emitter of transistor T1. The emitter of transistor T2 is electrically coupled to ground.

A first terminal of resistor R3 is configured to receive bias voltage Vg. A first terminal of capacitor C3 is electrically coupled to a second terminal of resistor R3. A second terminal of capacitor C3 is electrically coupled to ground. A second terminal of resistor R3 is configured to provide filtered bias voltage Vgf.

The base and collector of transistor T3 are configured to receive supply voltage VDD. A first terminal of capacitor C4 is electrically coupled to the emitter of transistor T3. A second terminal of capacitor C4 is electrically coupled to ground. The emitter of transistor T3 is configured to provide filtered supply voltage VDDf.

The base of transistor T4 is configured to receive filtered bias voltage Vgf. The collector of transistor T4 is configured to receive filtered supply voltage VDDf. The emitter of transistor T4 is configured to provide regulated voltage Vreg to load circuit 102.

The base and collector of transistor T5 are electrically coupled to the emitter of transistor T4. The emitter of transistor T5 is electrically coupled to ground.

When there is a positive spike in supply voltage VDD, filtered supply voltage VDDf will follow the spike. When there is a negative spike in supply voltage VDD, capacitor C4 holds the voltage and transistor T3 is shut off. In this way the transistor T3 and capacitor C4 filter out negative spikes but not positive spikes.

Bias voltage Vg is filtered by the ground-referenced bias filter comprising resistor R3 and capacitor C3. Being ground-referenced, the bias filter is insensitive to positive spikes in filtered supply voltage VDDf. The bias filter therefore provides a clean filtered gate voltage Vgf for transistor T4. As a result, regulated voltage Vreg is insensitive to any spikes in supply voltage VDD.

Supply voltage VDD is also used for the supply voltage of operational amplifier A. Because operational amplifier A1 has limited bandwidth, high-frequency noise in supply voltage VDD does not appear at the output terminal of operational amplifier A in bias voltage Vg.

A number of implementations have been described. Nevertheless, various modifications may be made without departing from the scope of the disclosure. Accordingly, other implementations are within the scope of the following claims.

What is claimed is:

1. A voltage regulator comprising:
   a master circuit configured to provide a second reference voltage based on a first reference voltage and a supply voltage;
   a first filter configured to provide a filtered second reference voltage based on the second reference voltage, and to reject positive spikes in the second reference voltage;
   a second filter configured to provide a filtered supply voltage based on the supply voltage, and to reject negative spikes in the supply voltage; and
   a slave circuit configured to provide a third reference voltage based on the filtered second reference voltage and the filtered supply voltage,
   wherein the second filter comprises
      a first n-channel metal-oxide-semiconductor field-effect (NMOS) transistor, wherein a gate of the first NMOS transistor is configured to receive the supply voltage, and wherein a drain of the first NMOS transistor is configured to receive the supply voltage, and
      a first capacitor, wherein a first terminal of the first capacitor is electrically coupled to a source of the first NMOS transistor, and wherein a second terminal of the first capacitor is electrically coupled to ground,
      wherein the source of the first NMOS transistor is configured to provide the filtered supply voltage.

2. The voltage regulator of claim 1, wherein the master circuit comprises:
   an operational amplifier, wherein a supply terminal of the operational amplifier is configured to receive the supply voltage, and wherein a positive input terminal of the operational amplifier is configured to receive the first reference voltage; and
   a second NMOS transistor, wherein a gate of the second NMOS transistor is electrically coupled to an output terminal of the operational amplifier, wherein a drain of the second NMOS transistor receives the filtered supply voltage, and wherein a source of the second NMOS transistor is electrically coupled to a negative input terminal of the operational amplifier; and
   wherein the gate of the second NMOS transistor is configured to provide the second reference voltage.

3. The voltage regulator of claim 2, wherein the master circuit further comprises:
   a third NMOS transistor, wherein a gate of the third NMOS transistor is electrically coupled to the source of the second NMOS transistor, wherein a drain of the third NMOS transistor is electrically coupled to the source of the second NMOS transistor, and wherein a source of the third NMOS transistor is electrically coupled to ground.

4. The voltage regulator of claim 3, wherein the first filter comprises:
   a resistor, wherein a first terminal of the resistor is configured to receive the second reference voltage; and
   a second capacitor, wherein a first terminal of the second capacitor is electrically coupled to a second terminal of the resistor, and wherein a second terminal of the second capacitor is electrically coupled to ground; and
   wherein the second terminal of the resistor is configured to provide the filtered second reference voltage.

5. The voltage regulator of claim 1, wherein the slave circuit comprises:
   a second NMOS transistor, wherein a gate of the second NMOS transistor is configured to receive the filtered second reference voltage, wherein a drain of the second NMOS transistor is configured to receive the filtered supply voltage, and wherein a source of the second NMOS transistor is configured to provide the third reference voltage.

6. The voltage regulator of claim 5, wherein the slave circuit further comprises:
   a third NMOS transistor, wherein a gate of the third NMOS transistor is electrically coupled to the source of the second NMOS transistor, wherein a drain of the third NMOS transistor is electrically coupled to the source of the second NMOS transistor, and wherein a source of the third NMOS transistor is electrically coupled to ground.

7. An integrated circuit comprising:
   the voltage regulator of claim 6; and
   a load circuit, wherein the load circuit is configured to receive the third reference voltage.

8. The integrated circuit of claim 7, further comprising:
   a switching circuit, wherein the switching circuit creates at least one of
      the positive spikes in the supply voltage, and
      the negative spikes in the supply voltage.

9. An integrated circuit comprising:
   the voltage regulator of claim 1; and
   a load circuit, wherein the load circuit is configured to receive the third reference voltage.

10. The integrated circuit of claim 9, further comprising:
    a switching circuit, wherein the switching circuit creates at least one of
       the positive spikes in the supply voltage, and
       the negative spikes in the supply voltage.

11. A voltage regulator comprising:
    a master circuit configured to provide a second reference voltage based on a first reference voltage and a supply voltage;
    a first filter configured to provide a filtered second reference voltage based on the second reference voltage, and to reject positive spikes in the second reference voltage;
    a second filter configured to provide a filtered supply voltage based on the supply voltage, and to reject negative spikes in the supply voltage; and
    a slave circuit configured to provide a third reference voltage based on the filtered second reference voltage and the filtered supply voltage,
    wherein the second filter comprises
       a first NPN bipolar junction transistor (BJT), wherein a base of the first NPN BJT is configured to receive the supply voltage, and wherein a collector of the first NPN BIT is configured to receive the supply voltage; and a first capacitor, wherein a first terminal of the first capacitor is electrically coupled to an emitter of the first NPN BJT, and wherein a second terminal of the first capacitor is electrically coupled to ground, wherein the emitter of the first NPN BJT is configured to provide the filtered supply voltage.

12. The voltage regulator of claim 11, wherein the master circuit comprises:

an operational amplifier, wherein a supply terminal of the operational amplifier is configured to receive the supply voltage, and wherein a positive input terminal of the operational amplifier is configured to receive the first reference voltage; and a second NPN BJT, wherein a base of the second NPN BJT is electrically coupled to an output terminal of the operational amplifier, wherein a collector of the second NPN BJT is electrically coupled to the filtered supply voltage, and wherein an emitter of the second NPN BJT is electrically coupled to a negative input terminal of the operational amplifier; and wherein the base of the second NPN BJT is configured to provide the second reference voltage.

13. The voltage regulator of claim 12, wherein the master circuit further comprises:

a third NPN BJT, wherein a base of the third NPN BJT is electrically coupled to the emitter of the second NPN BJT, wherein a collector of the third NPN BJT is electrically coupled to the emitter of the second NPN BJT, and wherein an emitter of the third NPN BJT is electrically coupled to ground.

14. The voltage regulator of claim 13, wherein the first filter comprises:

a resistor, wherein a first terminal of the resistor is configured to receive the second reference voltage; and a second capacitor, wherein a first terminal of the second capacitor is electrically coupled to a second terminal of the resistor, and wherein a second terminal of the second capacitor is electrically coupled to ground, wherein the second terminal of the resistor is configured to provide the filtered second reference voltage.

15. An integrated circuit comprising:
the voltage regulator of claim 12; and
a load circuit, wherein the load circuit is configured to receive the third reference voltage.

16. The integrated circuit of claim 15, further comprising:
a switching circuit, wherein the switching circuit creates at least one of
the positive spikes in the supply voltage, and
the negative spikes in the supply voltage.

17. The voltage regulator of claim 11, wherein the slave circuit comprises:

a second NPN BJT, wherein a base of the second NPN BJT is configured to receive the filtered second reference voltage, wherein a collector of the second NPN BJT is configured to receive the filtered supply voltage, and wherein an emitter of the second NPN BJT is configured to provide the third reference voltage.

18. The voltage regulator of claim 17, wherein the slave circuit further comprises:

a third NPN BJT, wherein a base of the third NPN BJT is electrically coupled to the emitter of the second NPN BIT, wherein a collector of the third NPN BJT is electrically coupled to the emitter of the NPN BJT, and wherein an emitter of the third NPN BJT is electrically coupled to ground.

\* \* \* \* \*